United States Patent Office 2,848,662
Patented Aug. 19, 1958

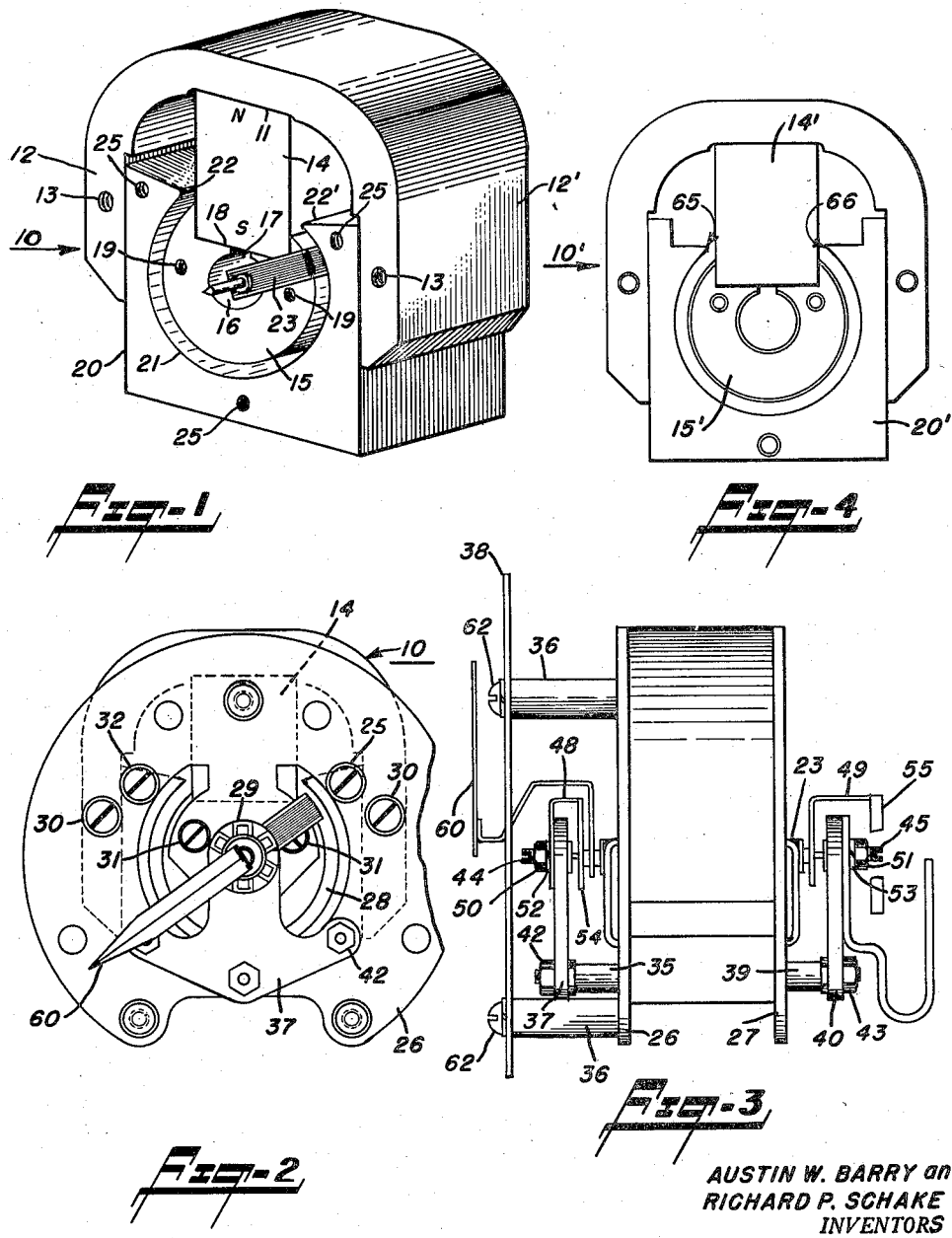

2,848,662

INSTRUMENT MAGNETIC SYSTEM

Austin W. Barry, Linden, and Richard P. Schake, East Orange, N. J., assignors, by mesne assignments, to Daystrom, Incorporated, Murray Hill, N. J., a corporation of New Jersey Application July 10, 1956, Serial No. 596,916

6 Claims. (Cl. 317—166)

This invention relates to an electrical measuring instrument and more particularly to a permanent-magnet, movable coil instrument having an improved magnetic system.

The invention contemplates the provision of an instrument having a pointer-deflection of 250 angular degrees and incorporating a novel construction and arrangement of the magnetic structure. The permanent magnet is of relatively small size and of extremely simple shape resulting in manufacturing economy without sacrifice of instrument sensitivity. Such magnet is disposed between a U-shaped, soft-iron yoke, having a pole piece attached thereto, and a generally cylindrical, soft-iron core whereby the magnet effectively is shielded from external magnetic fields. The effective air gap is formed between the core and a soft-iron pole piece that extends inwardly from the ends of the yoke, and is of sufficient width to allow one side of a movable coil of many turns to be rotatably mounted therein. The increased number of coil turns over that employed in the ordinary instrument, made possible with out novel improved magnetic system, results in an instrument of increased sensitivity as compared to contemporary instruments of comparable size and weight. The construction to be described herein lends itself to the provision of a standard magnetic structure adapted for use in instruments of small size.

An object of this invention is the provision of an improved electrical instrument of high inherent accuracy and which is extremely sensitive.

An object of this invention is the provision of a permanent-magnet, movable coil instrument having a pointer deflection of approximately 250 angular degrees and in which the magnetic structure is compact and self shielded from external magnetic fields.

An object of this invention is the provision of an improved magnetic structure for long scale electrical instruments wherein the operative air gap is of sufficient width to allow a movable coil of many turns to rotate therein whereby an extremely sensitive measuring instrument results.

An object of this invention is the provision of a magnetic structure for electrical instruments comprising a U-shaped, soft-iron yoke, a pole piece extending inwardly from the inner ends of the yoke and having a bore extending longitudinally therethrough and opening upwardly through the top thereof, a soft-iron core disposed in the said bore in the pole piece to form an air gap therewith and a permanent magnet disposed between recesses in the yoke and core, the said upwardly disposed opening in the said pole piece terminating in a sharp edge whereupon flux leakage between the pole piece and the said magnet is minimized.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

In the drawings wherein like reference characters denote like parts in the several views:

Figure 1 is an isometric view of a single air gap instrument showing the magnet, yoke, pole piece and core along with an operatively positioned movable coil, Figure 2 is an end view of the instrument of Figure 1 with the addition of front and back mounting plates attached thereto, Figure 3 is a side view of the instrument shown in Figure 2, with the addition of an instrument scale, and Figure 4 is a front view of a magnetic structure assembly showing another embodiment of the invention.

Reference is now made to Figure 1 of the drawings wherein there is shown a magnetic structure assembly comprising a soft-iron yoke 10 of U-shape and provided with a longitudinal recess 11. The U-shaped yoke may be provided with reduced thickness portions 12 and 12' which extend substantially the entire length of the arms. Holes 13 in the face of the yoke provide means wherein the yoke may be secured to a front mounting plate to be described later.

A permanent magnet 14, in the shape of a small rectangular block, is magnetized as indicated, for example, by the polar markings N and S. The upper polar surface is adapted to fit closely within the recess 11 in the yoke 10. Reference numeral 15 designates a soft-iron core which comprises a portion of a right cylinder having an axial bore 16 extending therethrough and a radial slot 17 running the full length thereof. The radial slot 17 permits the insertion of one side of the instrument movable coil within the bore of the core as is common in this art. A longitudinal recess 18 is cut by a milling operation, or otherwise formed, along the outer surface of the core 15 immediately adjacent the radial slot 17. The lower polar surface of the permanent magnet 14 is adapted to fit closely within the recess 18. As will become apparent below, this construction of recessing the core 15 permits full utilization of the orientation properties of the magnet 14 and comprises an important feature of this invention. Substantially all of the magnetic flux near the lower end of the magnet 14 enters into the core 15 and so ultimately into the instrument air gap. Threaded holes 19 in the front face of the core (and similar threaded holes in the rear face of the core not visible in the drawings) provide means whereby the core may be secured to front and rear mounting plates to be described later.

A pole piece 20, made from a single piece of soft-iron, is provided with a pair of vertical outwardly facing side surfaces which closely abut the inwardly facing surfaces of the reduced portions 12 and 12' of the yoke 10. The pole piece 20 is provided with a bore 21, the surface of which is in the form of a portion of a right cylinder. An opening at the top of the pole piece which extends the entire longitudinal length thereof, provides a gap through which the magnet 14 extends. A feature of this invention is the provision of a pole piece having a structure such that magnetic flux leakage between the pole piece and the magnet is a minimum. This is accomplished by terminating the opening through the top of the pole piece in relatively sharp edges 22 and 22'. By providing the pole piece with extremely narrow edges at these particular points, leakage flux between the pole piece and magnet 13 is reduced to a minimum. In addition, it will be noted that the edges 22 and 22' are positioned approximately one-fourth of the length of the magnet up from the bottom of the magnet. This likewise reduces leakage flux between the magnet and pole piece as the amount of flux emanating from a point one-fourth of the distance from the end of the magnet is considerably less than the flux at the end of the magnet. Threaded holes 25 in the front surface of the pole piece (and similar threaded holes in the rear surface, not visible in Figure 1) provide means whereby the pole piece may be mounted on front and rear mounting plates to be discussed later.

In instruments of the type under consideration, commonly referred to as single air gap instruments, the soft-iron core 15 is disposed within the bore of the pole piece 20. One side of the movable coil 23 operates within the bore of the core and produces no rotational torque whereas the opposite side of the coil operates within a magnetic flux gap formed between the core and the inner surface of the pole piece. In order to provide a uniform instrument scale it is necessary that such flux gap be uniform throughout its entire extent. Since the core and pole piece are separate units forming part of the magnetic structure, they must be properly supported, and for this purpose mounting plates 26 and 27 (as seen in Figures 2 and 3 of the drawings) are provided; the front such plate also carrying means for supporting an instrument scale plate.

Referring to Figures 2 and 3 of the drawings the front and back mounting plates 26 and 27, respectively, which are made of non-magnetic material, are located at the front and back of the instrument magnetic structure. Only the front mounting plate 26 is visible to Figure 2, however, it will be understood that the rear mounting plate 27 is similar in design. Each mounting plate 26 and 27 is provided with a relatively long arcuate slot 28 which registers with the magnetic gap between the pole piece 20 and core 15. A circular opening 29 is provided concentric with the arcuate slot 28 and has a diameter corresponding to the diameter of the bore 16 in the core 15. The mounting plates are also provided with a series of accurately located holes which accommodate small screw 30, 31 and 32 for securing the parts to the mounting plates. The holes in the plate, conform to the threaded holes 13, 19 and 25 in the yoke, core and pole pieces, respectively, within which the screws 30, 31 and 32, respectively, are engaged. The front mounting plate 26 also supports a pair of threaded posts 35 and three larger posts 36, which posts are secured thereto by a riveting operation. These posts serve to support the front instrument bridge 37 and the scale plate 38. A pair of posts 39, riveted to the rear mounting plate 27, serve to support the rear bridge 40 of the instrument.

A magnetic structure, as herein described, represents a very efficient use of the magnetic energy of the magnet and for this reason the magnet need be only a relatively small block of material to produce a small instrument having a high flux density in the operative air gap. It will be noted that all of the energy of the magnet is applied to useful purposes, with a minimum of flux leakage. The magnet is lengthened over that in instruments of similar construction, and its entire cross sectional area at the lower end is positioned inside of the outside diameter of the core. The magnet, effectively, is enclosed by soft-iron members, namely the yoke 10, the pole piece 20 and the core 15, which arrangement utilizes practically the full magnetic flux of the magnet and, at the same time, shields the magnet from external magnetic fields. Also, as mentioned above, the specific structure of the termination of the bore 21 in the pole piece 20, wherein only sharp edges 22 and 22' are presented parallel with the magnet 14, results in reduced leakage flux between the magnet and pole piece thereat. In addition, as mentioned earlier, the edges 22 and 22' are positioned approximately one-fourth of the way up from the bottom of the magnet 14 and so less flux leakage between the magnet and pole piece results at this point.

In Figure 2, the scale plate 38 has been omitted and part of the front mounting plate 26 has been broken away. The front bridge 37 is supported by the posts 35 extending from the front mounting plate 26 and secured thereto by the nuts 42. Similarly, the rear bridge 40 is supported by the posts 39 extending from the back mounting plate 27 and secured thereto by the nuts 43. Conventional jewel bearing screws 44 and 45 are threaded through the respective bridges for rotational support of the pivots that are attached to opposite sides of the wire-wound movable coil. Rotatably secured to each bridge are the abutments 48 and 49 as by the nuts 50 and 51 and spring washers 52 and 53, respectively. Each abutment is secured to an end of the associated spiral springs 54 and 55 through which current is conducted to the movable coil, as is well known. A pointer 60 is fastened to the movable coil and is bent, substantially as shown, to clear the top bridge 37; said pointer passing through a central opening in the scale plate 38 that is secured to the posts 36 by the screws 62.

A modification of the design of the ends of the pole piece is embodied in a magnetic system shown in Figure 4 of the drawings. Instead of tapering the ends of the pole piece as shown in Figures 1 through 3, the pole piece has been notched to form the sharp edges 65, 66 which extend parallel to the sides of the magnet 14' approximately one-fourth of the distance from the bottom of the magnet. Only a small amount of flux will leak to the pole piece 20' from the magnet 14' as only a small area, defined by the edges 65 and 66, is near the magnet, and then well up from the end of the magnet. The flux in the air gap between the core and pole piece is not adversely affected by terminating the pole piece ends in such sharp edges. By sinking the magnet 14' in the yoke 10' and core 15', almost all of the flux near the ends of the magnet will enter the yoke and core, respectively, and so ultimately pass through the air gap as useful flux.

Having now described our invention in detail in accordance with the patent statutes, various changes and modifications will suggest themselves to those skilled in this art, and it is intended that such changes and modifications shall fall within the spirit and scope of the invention as recited in the following claims.

We claim:

1. A magnetic structure for electrical instruments comprising a substantially U-shaped soft-iron yoke having an upper portion and substantially parallel spaced legs; a soft-iron pole piece abutting the legs of the yoke and closing the open end thereof, the said pole piece having a substantially circular bore extending longitudinally therethrough and opening upwardly through the top thereof, the pole piece top surface and circular bore terminating substantially in a common line; a cylindrical soft-iron core disposed within the bore of the pole piece and having its outer surface spaced from the walls of the said bore to form an arcuate flux gap, said core including an axial hole extending therethrough and an upwardly facing radial slot extending the entire length of the core and communicating with the said axial hole; a substantially rectangular permanent magnet having opposed parallel polar surfaces, one polar surface abutting the upper portion of the said yoke and the other polar surface abutting the core adjacent the said radial slot.

2. The invention as recited in claim 1 including a longitudinal recess adjacent the radial slot in the core within which recess the said other polar surface of the magnet is positioned.

3. A magnetic structure for electrical instruments comprising a substantially U-shaped soft-iron yoke having an upper portion and substantially parallel spaced legs; a soft-iron pole piece having opposed parallel surfaces abutting the legs of the yoke, the said pole piece having a bore extending longitudinally therethrough and opening to the top thereof, the top surface of the pole piece being provided with a recess adjacent the said bore opening to the top; a soft-iron core disposed within the bore of the pole piece and having a hole extending axially therethrough, a radial slot extending longitudinally the entire length of the core and communicating with the axially extending hole, a longitudinal recess adjacent the slot; and a substantially rectangular permanent magnet having opposed parallel upper and lower polar surfaces which engage the said yoke and core recess, respectively, whereby the said bore opening to the top in the said pole piece is positioned above the lower polar surface of the said permanent magnet.

4. A magnetic structure for electrical instruments comprising a substantially U-shaped soft-iron yoke having an upper portion and substantially parallel spaced legs; a soft-iron pole piece abutting the legs of the yoke and closing the end thereof, the said pole piece having a substantially circular bore extending longitudinally therethrough and opening upwardly through the top thereof whereby a pair of upwardly extending pole piece members are formed, the top surfaces of the said pole piece members being inwardly inclined and each substantially terminating at one end with the circular bore; a cylindrical soft-iron core disposed within the circular bore of the pole piece and having its outer surface spaced from the walls of the said bore to form an arcuate flux gap, the said core including an axial hole extending therethrough and an upwardly facing radial slot extending the entire length of the core; a substantially rectangular permanent magnet having opposed parallel polar surfaces, one polar surface abutting the upper portion of the said yoke and the other polar surface abutting the said core adjacent the said radial slot.

5. The invention as recited in claim 4 including a longitudinal recess adjacent the radial slot in the core within which recess the said other polar surface of the magnet is disposed.

6. In a moving coil electric measuring instrument, the combination of a U-shaped yoke comprising a solid upper portion and spaced lower side arms integral with the solid upper portion and terminating in substantially vertical inwardly facing plane surfaces of reduced thickness, the under surface of the said upper portion of the U-shaped yoke being provided with a longitudinal recess therein; a pole piece having substantially vertical outwardly facing surfaces abutting against the inwardly facing plane surfaces of the side arms of the said U-shaped yoke and spaced downwardly from the solid upper portion of the said U-shaped yoke, the said pole piece having a substantially circular hole extending longitudinally therethrough and opening upwardly through the top of the said pole piece, the said top of the pole piece and surface of the said circular hole intersecting substantially in a line; a core comprising substantially a portion of a right cylinder spaced substantially a uniform radial distance from the inner surface of the said cylindrical opening in the pole piece to define an arcuate magnetic gap between the said core and pole piece of substantially uniform radial dimension, the upper portion of the core being provided with a slot which extends longitudinally the entire length of the said core, a recessed portion adjacent the slot and extending longitudinally therewith; a magnet of substantially rectangular shape and having opposite polar surfaces which abut the recess in the yoke and the recess in the core; and a coil having its inner side leg passing through the axial hole in the core and having its outer side leg passing through the said magnetic gap, the said coil being rotatably mounted so as to move through the magnet gap.

References Cited in the file of this patent
UNITED STATES PATENTS
2,572,639    Lovegrove _____ Oct. 23, 1951